United States Patent [19]
Morford

[11] 3,786,591
[45] Jan. 22, 1974

[54] MOUSE TRAP

[76] Inventor: Marvin A. Morford, 1815 Ashworth Rd., West Des Moines, Iowa 50265

[22] Filed: June 3, 1971

[21] Appl. No.: 149,459

[52] U.S. Cl. .................................................. 43/66
[51] Int. Cl. ............................................. A01m 23/08
[58] Field of Search .............................. 43/66, 67

[56] References Cited
UNITED STATES PATENTS

| | | | |
|---|---|---|---|
| 986,977 | 3/1911 | Harris | 43/66 |
| 729,786 | 6/1903 | McDaniel | 43/66 |
| 1,108,724 | 8/1914 | Draper et al. | 43/67 |
| 1,117,450 | 11/1914 | Schreck | 43/66 |
| 1,191,706 | 7/1916 | Kesler | 43/66 |
| 1,349,453 | 8/1920 | Hall | 43/67 |
| 2,587,349 | 2/1952 | Mace | 43/67 |

Primary Examiner—Warner H. Camp
Attorney, Agent, or Firm—Zarley, McKee & Thomte

[57] ABSTRACT

A housing having trap passageways at opposite ends closely adjacent one housing side wall. A trap door or floor in the passageway upon being pivoted downwardly under the weight of the mouse operates through a linkage a gate which pivots upwardly allowing the mouse to enter the interior of the housing whereupon the gate closes locking the mouse in the housing. A removable slidable top on the housing allows emptying of the trap. Openings are provided in the gates and housing end walls. The oppositely disposed passageways close to one housing side wall accommodates the natural instincts of mice to keep close to a wall and seek safety in small openings and passageways.

1 Claim, 5 Drawing Figures

PATENTED JAN 22 1974      3,786,591

INVENTOR
MARVIN A MORFORD
BY
Zarley, McKee & Thomte
ATTORNEYS dd# MOUSE TRAP

Mouse traps presently available suffer from many shortcomings. Some mouse traps will only handle one mouse at a time. Other traps are too complicated and expensive to be practical. Still other mouse traps are too messy and cause injury or death to the mice upon being trapped.

The mouse trap of this invention is extremely simple in structure and operation and will accommodate a plurality of mice without causing injury to any of them. The trap is easily emptied. Furthermore, the design of the trap exploits the natural instincts of mice in their desire to stay close to walls and seek protection in small openings. The width of the housing of the trap discourages the mouse from bypassing the passageway into the trap. The trap is symmetrical in appearance and provides inlet passageways at opposite ends, thus the trap has the capacity of catching mice coming along a wall from either direction.

Upon the mouse entering the inlet in the end wall of the housing, it steps on a pivotal floor in the passageway which upon pivoting downwardly causes a gate at the inner end of the passageway to pivot upwardly thereby providing access into the interior of the housing. Upon the mouse leaving the passageway and stepping off of the pivotal floor the gate pivots downwardly to a closed position. The pivotal floor and gate are balanced such that the gate is normally in a down closed position.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
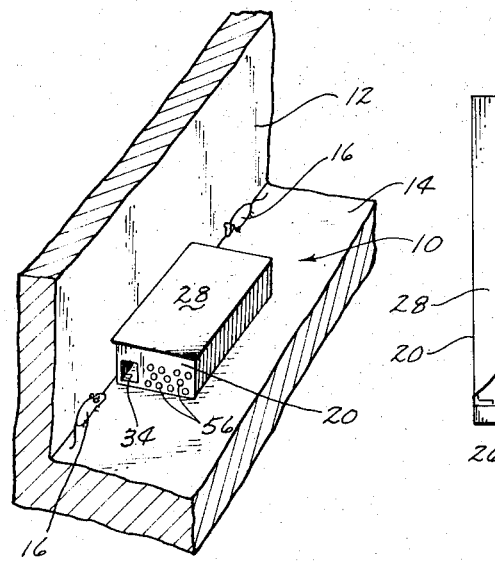
FIG. 1 is a fragmentary perspective view of the mouse trap of this invention in use along a wall.

The mouse trap of this invention is referred to generally in FIG. 1 by the reference numeral 10 and is shown positioned against a room wall 12 on the floor 14. Mice 16 moving along the wall 12 may be caught by the trap 10 since the trap includes trap passageways 18 at opposite ends.

The trap 10 includes opposite end walls 20, side walls 22 and 24, a bottom wall 26 and a top 28. Each end of the housing, including the trap passageway 18, is identical in appearance and structure.

Figure 3:
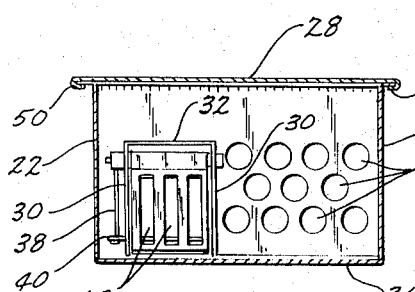
FIG. 3 is a cross sectional view taken along line 3 — 3 in FIG. 2.
Figure 4:
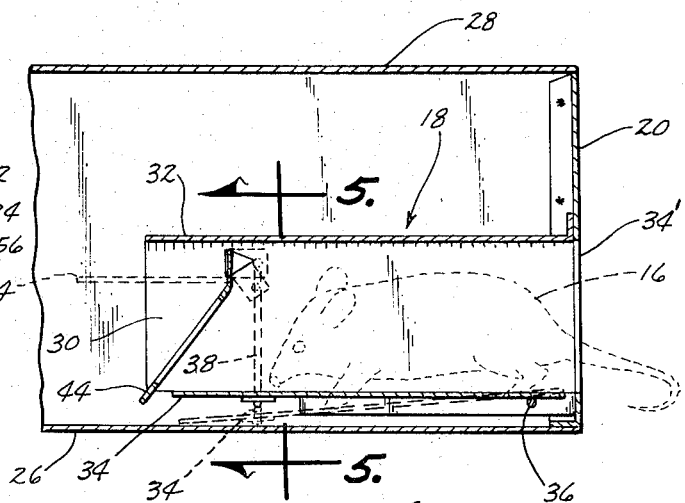
FIG. 4 is a cross sectional view taken along line 4 — 4 in FIG. 2.
Figure 5:
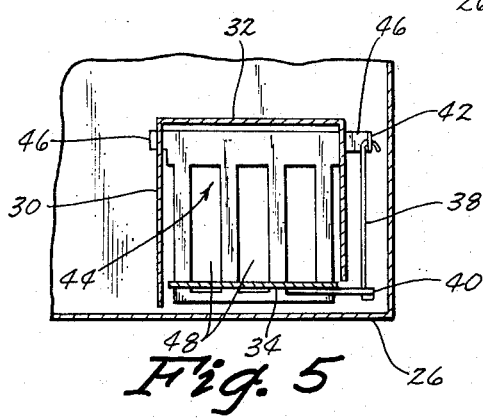
FIG. 5 is a cross sectional view taken along line 5 — 5 in FIG. 4.

As seen in FIG. 4, the trap passageway 18 includes side walls 30 interconnected by a top or cover wall 32. The passageway side wall 30, as seen in FIG. 3, is closely spaced to the housing side wall 22 to position the inlet opening 34' in the end wall 20 as closely as possible to the room wall 12. A trap door or floor 34 is provided in the passageway 18 on an axial pivot pin 36 extending transversely thereof and received in the opposite passageway side walls 30 closely adjacent the end wall 20 inlet opening 34'. As seen by the dash-line configuration in FIG. 4, the floor 34 may pivot downwardly at its inner end until it engages the housing bottom wall 26. An actuating link 38 is coupled to a laterally outwardly extending element 40 on the passageway floor 34 and extends upwardly into engagement with an element 42 positioned outwardly of a gate 44 and the opposite side walls 30 to which the gate is pivoted by laterally outwardly extending elements 46. The element 42 is connected to the adjacent axial element 46 and provides a lever arm for pivoting the gate 44 between opened and closed positions, as seen by the dash and solid lines in FIG. 4. Elongated vertical slot openings 48 are provided in the gate 44 and it is seen in FIG. 4 that the gate is recessed inwardly of the inner end of the passageway 18, however, there is enough space between the closed gate and the inlet opening 34' to allow the mouse to fully enter the passageway 18.

The interior of the housing is accessible by the cover 28 being easily removed. The cover has U-shaped flanges 50 on its opposite sides embracing outwardly extending ledges 52 on the upper edge of the side walls 22 and 24.

The end walls 20 each have a plurality of openings 56 adjacent the passage inlet opening 34' to allow light to enter the interior of the trap and to allow visual inspection of the inside of the trap without removing the cover 28.

Figure 2:
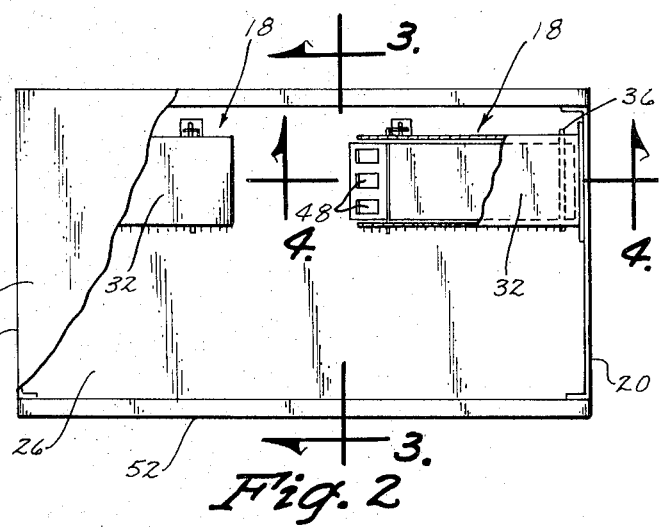
FIG. 2 is a fragmentary top plan view of the mouse trap.

Thus in operation it is seen that the trap of this invention will trap mice coming from opposite directions along a wall 12. It is quite natural for the mice to dart into the open passageways through the inlet openings 34' in the trap 10 since they are located in the line of travel along the wall 12. The width of the trap, as seen in FIG. 1, discourages the mice from walking around the trap. Also, the width is such that the mice have to walk a substantial distance from the wall where security is less for them and thus their natural instinct is to dart into the passageways 18. The openings 56 in the trap will also give them a feeling of security if other mice have already been trapped and are inside. Upon the mouse 16 stepping inside the passageway 18 onto the pivotal door 34, it will pivot downwardly to the dash-line position of FIG. 4 thereby causing the gate 44 to pivot upwardly to its dash-line position and the mouse will walk on inside into the interior chamber of the trap. As he steps off of the floor 34 the gate 44 will pivot closed. As seen in FIG. 2, the passageways 18 are in alignment with each other and are closely spaced to the adjacent side wall 22 of the housing. The spacing between the inner ends of the passageways is sufficient to allow the gates to swing open. Upon the trap being inspected it is easily ascertained from viewing the interior through the openings 56 whether or not the trap needs empting and if it does it is only necessary to pull the slide top 28 to an open position with the trap in an inverted position thereby removing the trapped mice.

I claim:

1. A mouse trap comprising, a housing including opposite side walls having outwardly extending ledges, opposite end walls, a floor and top wall, the top wall of said housing including U-shaped flanges slidably engaging said ledges and is removable for emptying said housing, an inlet opening formed in each of said end walls, and each of said end walls adjacent said inlet openings including a plurality of openings, a pair of elongated passageways entirely within said housing and parallel with one of said side walls and each having one open end in registration with one of said inlet openings, each said passageway including a single sheet of material folded to provide a top wall and opposite side walls, the width of each said passageway opening being less than the remaining width of the associated end wall, said housing including a common confinement area for mice entering said housing through the inlet opening in either end wall, a floor in each said passageway pivotal about an axis adjacent its respective inlet opening for movement between a normally level position to a down position, a gate in each said passageway having means for seeing through it and pivoted at its upper end to its respective passageway for movement between a closed position, closing its respective passageway to an open position with said gate pivoted outwardly away from said passageway, the opposite sides of each said gate having horizontally outwardly extending elements pivotally received in openings in said oppositely disposed passageway side walls, a lever arm inside said housing on one of said outwardly extending elements on each said gate extending perpendicularly and radially outwardly of the pivotal axis of each said gate, and a single linkage extending between said lever arm on each said gate and the inner end of the respective pivotal floor whereby upon said pivotal floor pivoting downwardly said gate is pivoted outwardly to said open position, said gate and floor being balanced such that such floor is normally raised to said level position and said gate is normally in said closed position, each said pivotal floor in said passageways being normally spaced above the floor in said housing whereby each said pivotal floor in said passageways in said down position engages at its outer free end the floor of said housing which limits downward pivotal movement thereof.

* * * * *